(12) United States Patent
Nader et al.

(10) Patent No.: US 11,536,901 B2
(45) Date of Patent: Dec. 27, 2022

(54) COMPACT AND EFFICIENT INTEGRATED PHOTONIC DEVICE FOR COUPLING LIGHT ON- AND OFF-CHIP

(71) Applicant: The Regents of the University of Colorado, Denver, CO (US)

(72) Inventors: Nima Nader, Boulder, CO (US); Jeffrey Chiles, Boulder, CO (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 0 days.

(21) Appl. No.: 16/527,604

(22) Filed: Jul. 31, 2019

(65) Prior Publication Data

US 2020/0049884 A1 Feb. 13, 2020

Related U.S. Application Data

(60) Provisional application No. 62/718,082, filed on Aug. 13, 2018.

(51) Int. Cl.
*G02B 6/122* (2006.01)
*G02B 6/12* (2006.01)

(52) U.S. Cl.
CPC .. *G02B 6/1228* (2013.01); *G02B 2006/12061* (2013.01); *G02B 2006/12147* (2013.01)

(58) Field of Classification Search
None
See application file for complete search history.

(56) References Cited

U.S. PATENT DOCUMENTS

| 5,121,450 | A | 6/1992 | Eichen et al. |
| 5,127,081 | A * | 6/1992 | Koren ............... G02B 6/125 385/130 |
| 6,707,968 | B2 | 3/2004 | Masuda et al. |
| 7,457,498 | B2 | 11/2008 | Miyadera et al. |
| 7,920,770 | B2 * | 4/2011 | Holzwarth ......... G02B 6/122 385/129 |
| 8,442,368 | B1 * | 5/2013 | Reano ................ G02B 6/132 385/39 |
| 9,547,129 | B1 * | 1/2017 | Kato .................. G02B 6/1228 |
| 9,804,423 | B2 * | 10/2017 | Reano .............. G02B 6/3504 |
| 2009/0003841 | A1 * | 1/2009 | Ghidini ............. G02F 1/2257 398/186 |
| 2009/0232445 | A1 * | 9/2009 | Jeong ............... G02B 6/125 385/14 |

(Continued)

OTHER PUBLICATIONS

Chi, et al., "Nonlinear Y-Junction Coupler", Electronic Letters, vol. 26 No. 5, Mar. 1, 1990, 339-340.

(Continued)

*Primary Examiner* — Chris H Chu
(74) *Attorney, Agent, or Firm* — Saul Ewing LLP; Kathryn Doyle; Brian R. Landry

(57) ABSTRACT

The present invention provides an optical coupler comprising: a first optical prong; a second optical prong; an optical waveguide with which the first optical prong and the second optical prong merge; wherein: a distance from an axially outer tip edge of the first optical prong to an axially outer tip edge of the first optical prong is greater than a planar width of the optical waveguide; and the first optical prong and the second optical prong are each tapered from the optical waveguide.

13 Claims, 9 Drawing Sheets

(56) References Cited

U.S. PATENT DOCUMENTS

| | | | |
|---|---|---|---|
| 2012/0076465 A1* | 3/2012 | Chen | G02B 6/1228 385/124 |
| 2012/0328243 A1* | 12/2012 | Fang | G02B 6/305 385/50 |
| 2015/0214122 A1* | 7/2015 | Vermeulen | H01L 22/30 438/14 |
| 2015/0277042 A1* | 10/2015 | Goodwill | G02B 6/126 385/11 |
| 2016/0041340 A1* | 2/2016 | Shi | G02B 6/305 385/14 |
| 2016/0055122 A1* | 2/2016 | Koranne | G02B 6/12011 703/2 |
| 2016/0136899 A1* | 5/2016 | Koranne | B29C 64/386 700/98 |
| 2016/0377809 A1* | 12/2016 | Yang | G02B 6/136 385/28 |
| 2017/0176678 A1* | 6/2017 | Oka | G02B 6/125 |

OTHER PUBLICATIONS

Chiles, J. et al., "Hybrid Integrated Photonic Platforms and Devices", A dissertation submitted in partial fulfillment of the requirements for the degree of Doctor of Philosophy in Optics, University of Central Florida, 2016.

Chiles, J. et al., "Mid-infrared integrated waveguide modulators based on silicon-on-lithium-niobate photonics", Optica, vol. 1 No. 5, Nov. 2014, 350-355.

Chiles, J. et al., "Mid-infrared supercontinuum generation in high-contrast, fusion-bonded silicon membrane waveguides". In the Proceedings of IEEE 2017, 313-314.

Chiles, J. et al., "Single-mode and single-polarization photonics with anchored-membrane waveguides", Optics Express, vol. 24 No. 17, Aug. 22, 2016, 7 pages.

Grossard, N. et al., "Low-loss and stable integrated optical Y-junction on lithium niobate modulators", ThG08, 2007, 3 pages.

Miller, S. A. et al., "Low-loss silicon platform for broadband mid-infrared photonics", Optica, vol. 4 No. 7, Jul. 2017, 707-712.

Miller, S. A. et al., "Low-Loss Silicon Platform for Broadband Mid-Infrared Photonics", Physics Optics, Mar. 10, 2017, 15 pages.

Soler Penades, J. et al., "Suspended silicon mid-infrared waveguide devices with subwavelength grating metamaterial cladding", Optics Express, vol. 24 No. 20, Oct. 3, 2016, 9 pages.

Shankar, R. et al., "Mid-Infrared Photonics in Silicon", Doctoral dissertation, Harvard University, Jun. 8, 2018, 135 pages.

Thoma, F. et al., "Stress-Free Bonding Technology with Pyrex for Highly Integrated 3D Fluidic Microsystems", Micromachines, 5, 2014, 783-796.

* cited by examiner

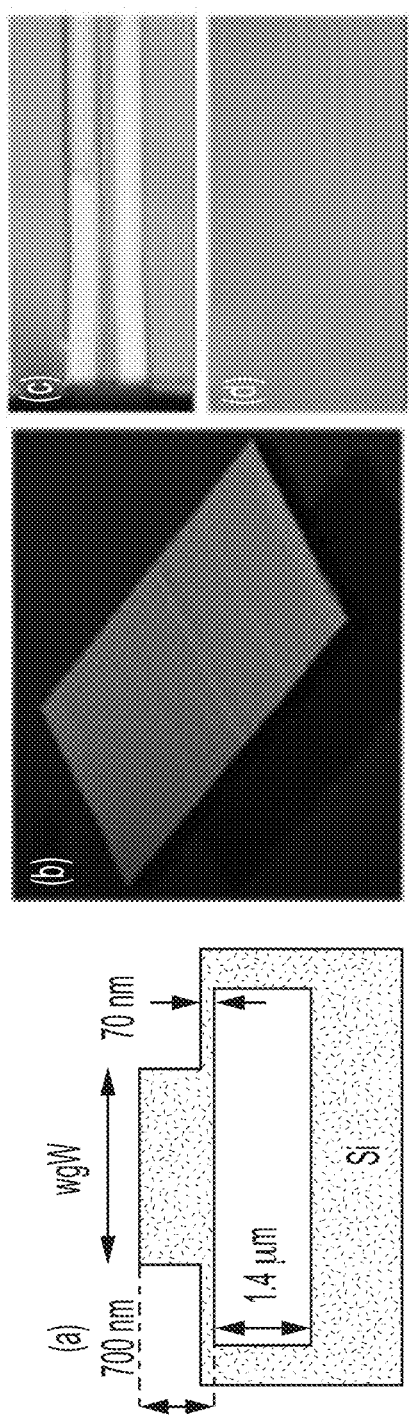
FIG. 5, Panels (a)-(d)

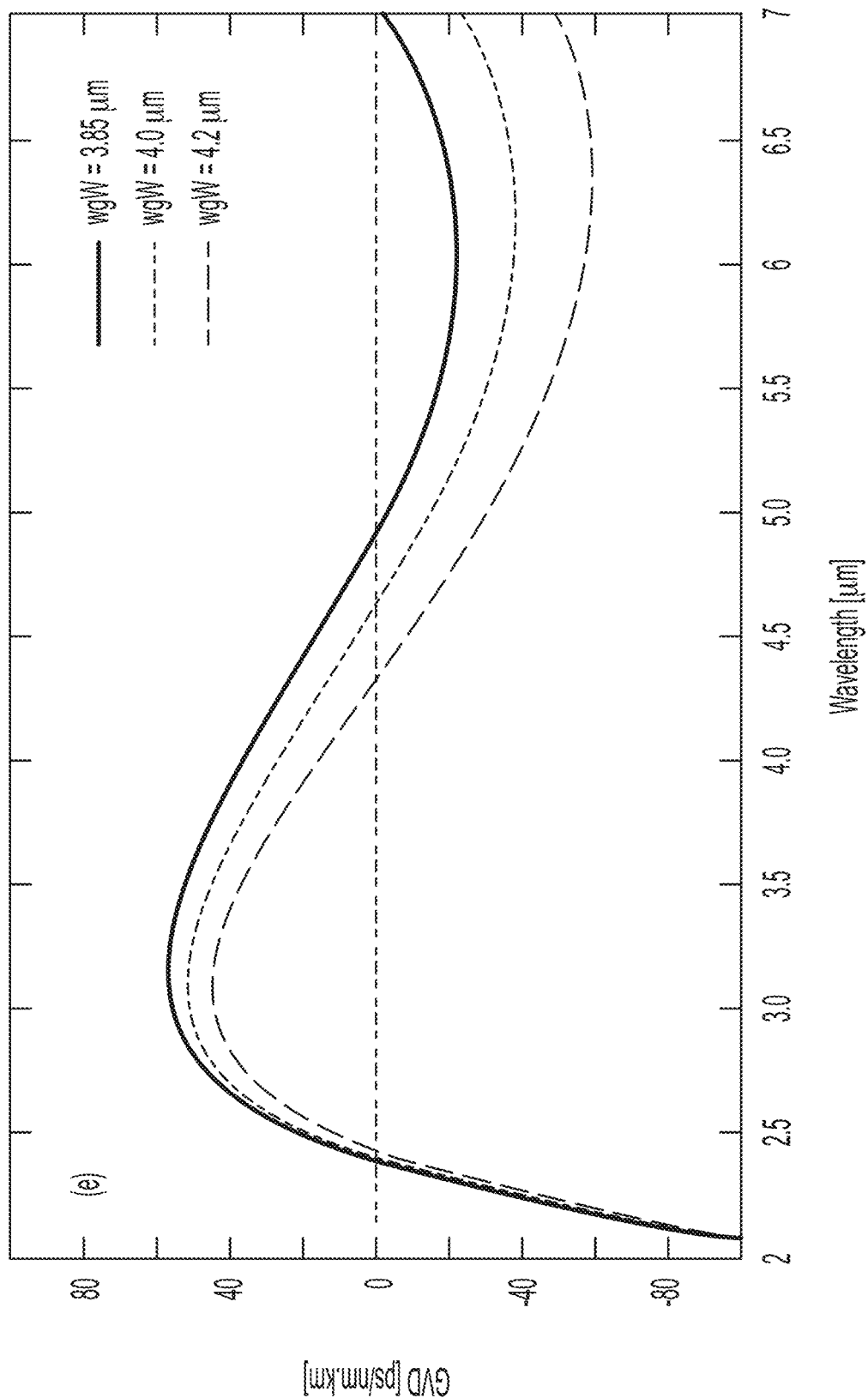
FIG. 5, Panel (e)

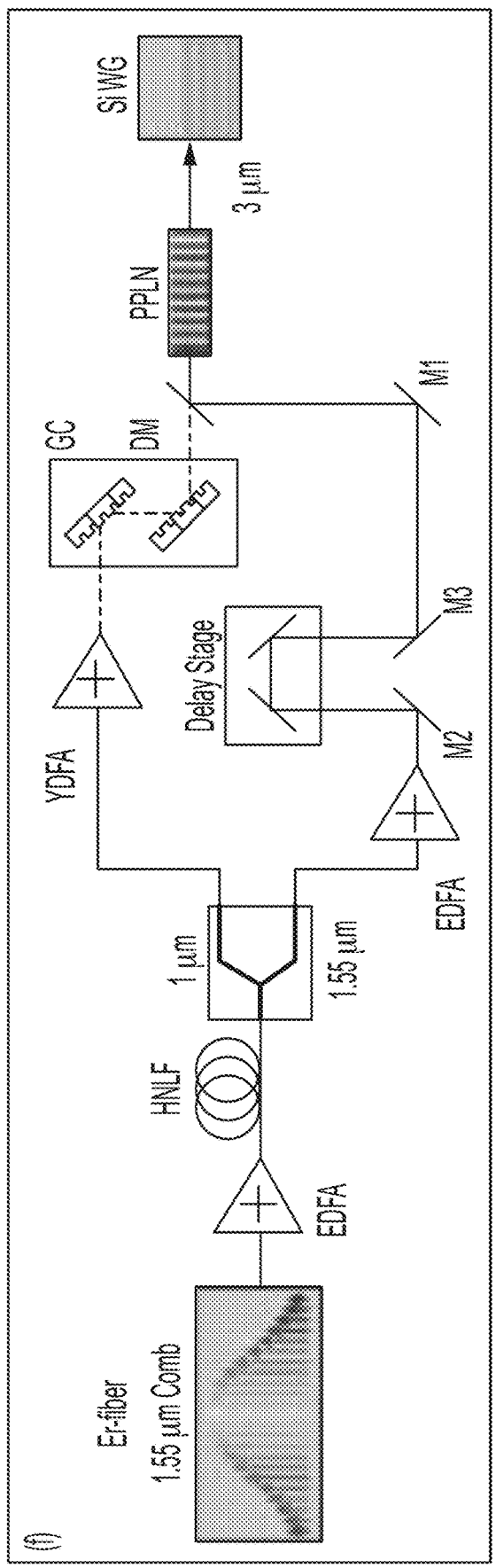
FIG. 5, Panel (f)

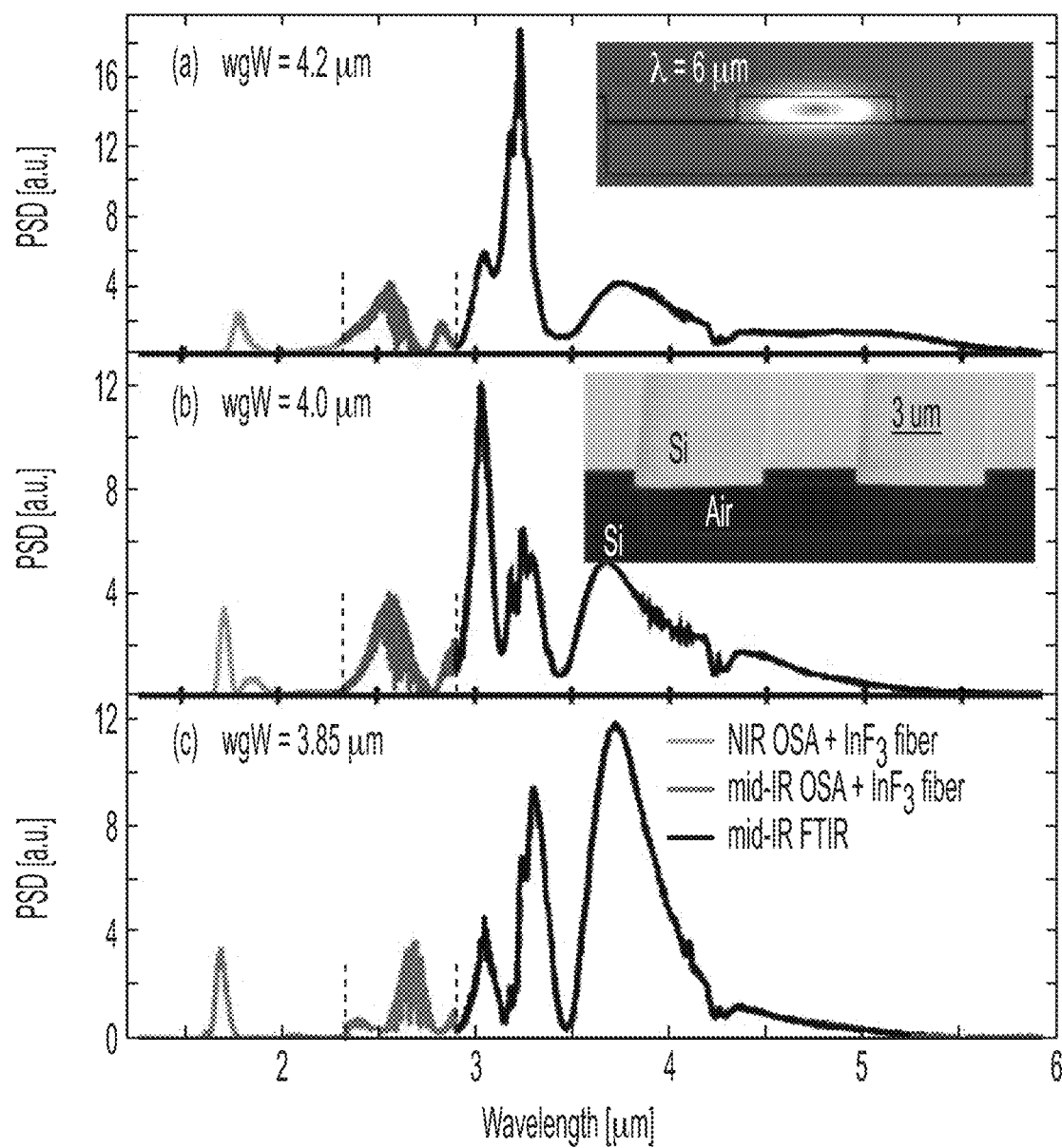
FIG. 6, Panels (a)-(c)

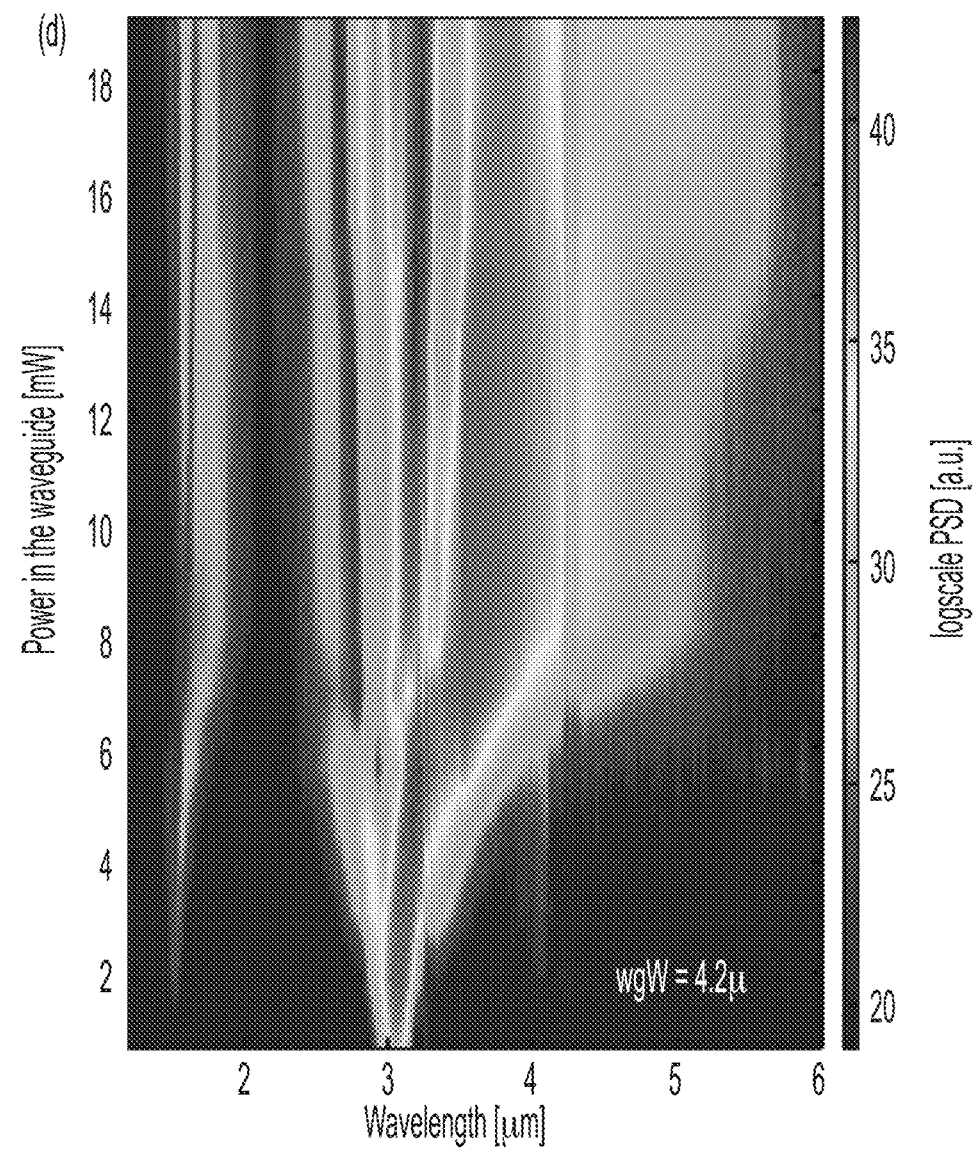
FIG. 6, Panels (d)

COMPACT AND EFFICIENT INTEGRATED PHOTONIC DEVICE FOR COUPLING LIGHT ON- AND OFF-CHIP

CROSS-REFERENCE TO RELATED APPLICATION

This application claims the benefit of priority under 35 U.S.C. § 119(e) to U.S. Provisional Patent Application Ser. No. 62/718,082, filed Aug. 13, 2018. The entire content of this application is hereby incorporated by reference herein.

STATEMENT REGARDING FEDERALLY SPONSORED RESEARCH OR DEVELOPMENT

This invention was made with government support under the DARPA SCOUT program Award No. 1503-686-28 by the United States Department of Defense. The government has certain rights in the invention.

BACKGROUND OF THE INVENTION

Integrated photonic technology developed for the mid- and longwave-infrared spectrum of light offers opportunities to use group velocity dispersion (GVD) engineered devices in conjunction with high-power, ultrafast mid-IR lasers to generate on-chip supercontinuum spectra suitable for myriad applications. Among those applications include the analysis of complex liquid and gas mixtures for environmental, industrial and military applications. Silicon and group III-V photonics are promising material platforms for such technologies. However, in order to avoid intrinsic material losses of the cladding layer found in conventional platforms, suspended geometries become necessary. Consequently, suspended waveguide edge couplers for efficient in- and out-coupling of mid- and longwave-infrared light to photonic waveguides are a critical requirement.

SUMMARY OF THE INVENTION

One aspect of the invention provides an optical coupler including: a first optical prong; a second optical prong; and an optical waveguide with which the first optical prong and the second optical prong merge. A distance from an axially outer tip edge of the first optical prong to an axially outer tip edge of the first optical prong is greater than a planar width of the optical waveguide. The first optical prong and the second optical prong are each tapered from the optical waveguide.

This aspect of the invention can have a variety of embodiments. The first optical prong and the second optical prong can be continuously tapered. The first optical prong and the second optical prong can have a planar profile selected from the group consisting of: sinusoidal and Bézier-type.

The optical waveguide can be a suspended optical waveguide. The first optical prong and the second optical prong can be suspended optical waveguides.

The first optical prong and the second optical prong can be at least partially cantilevered. The first optical prong and the second optical prong can be fully cantilevered.

The first optical prong and the second optical prong can each have an axial length from tip to merger of about 20 µm or less. The first optical prong and the second optical prong can each have an axial length from tip to merger of about 15 µm.

The first optical prong and the second optical prong can each have a planar width greater than 100 nm but less than about 2500 nm. The first optical prong and the second optical prong can each have a tip-to-tip gap of between 300 nm to 2000 nm.

The optical waveguide can taper to a planar width of about 300 nm to 4500 nm. The optical waveguide can taper to a planar width selected from the group consisting of: about 3.1 µm, about 3.85 µm, about 4.0 µm, and about 4.2 µm.

The first optical prong, the second optical prong, and the optical waveguide can each be silicon waveguides.

The first optical prong, the second optical prong, and the optical waveguide can form a complete device which may consist of one of a variety of materials, including but not limited to: dielectrics such as silicon nitride, tantalum pentoxide, aluminum oxide, silicon oxynitride, lithium niobate, or aluminum nitride, semiconductors such as: group III-V compound semiconductors (gallium arsenide and ternary/quaternary compounds such as AlGaAs, InGaAs, InGaAsP), gallium nitride, gallium phosphide, and others.

The first optical prong, the second optical prong, and the optical waveguide can form a complete device consisting of materials selected from the group consisting of: dielectrics, silicon nitride, tantalum pentoxide, aluminum oxide, silicon oxynitride, lithium niobate, aluminum nitride, semiconductors, group III-V compound semiconductors, gallium arsenide, ternary/quaternary compounds, AlGaAs, InGaAs, InGaAsP, gallium nitride, and gallium phosphide.

The entire structure can be embedded in a cladding material of lower refractive index than the waveguiding structure, such as silicon dioxide.

The entire structure can be embedded in a cladding material of lower refractive index than the optical waveguide. The cladding material can be silicon dioxide.

Another aspect of invention provides a suspended optical waveguide including: an optical waveguide; a trench parallel to and below a surface of the waveguide; bridging coupled to the optical waveguide and suspending the optical waveguide over the trench; and a plurality of walls angled with respect to the optical waveguide, each of the walls providing a fluid-tight seal across the trench.

This aspect of the invention can have a variety of embodiments. The walls can form an angle with the optical waveguide greater than 0°, but less than 45°. The walls can be positioned at a 45° angle with respect to the optical waveguide. The walls can form an angle with the optical waveguide greater than 45°, but less than 90°. The walls can be positioned at a right (90°) angle with respect to the optical waveguide.

Two adjacent walls of the plurality of walls can define, in part, a microfluidic channel extending at an angle beyond the trench.

The walls can have a thickness between 200 nm to 800 nm.

The walls underneath can consist of the same material as the optical waveguide. The walls underneath can consist of a different material from that of the optical waveguide.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 3, Panel (a) depicts an optical micrograph of a fabricated coupler. FIG. 3, Panel (b) depicts a scanning electron micrograph (SEM) of a cleaved waveguide facet. FIG. 3, Panel (c) depicts a 3D schematic of an edge coupler design.

FIG. 4, Panel (a) depicts multimode interferometer (MMIs); FIG. 4, Panel (b) depicts Y-junctions; FIG. 4, Panel (c) depicts 90° bends; and, FIG. 4 Panel (d) depicts buried channel isolators.

FIG. 5, comprising Panels (a) through (f), depicts exemplary suspended-Si waveguide designs, fabrication methods and testing results. FIG. 5, Panel (a) depicts a schematic diagram of the suspended-Si waveguide cross sections. FIG. 5, Panel (b)-(d) depict stacked-focus optical micrograph of a fabricated suspended-Si chip (Panel (b)), forked-shaped coupler (Panel (c)), and a paperclip device (Panel (d)), respectively. FIG. 5, Panel (e) depicts dispersion curves of the waveguides with waveguide width (wgW) of 4.3 μm, 4.0 μm, and 3.85 μm. FIG. 5, Panel (f) depicts a diagram of the experimental setup used to pump the suspended-Si waveguides. HNLF: Highly nonlinear fiber, EDFA: Erbium doped fiber amplifiers, YDFA: Ytterbium doped fiber amplifier, M1, M2, M3, and M4: gold mirrors, DM: Dichroic mirror, PPLN: Periodically poled lithium niobate, Si WG: Silicon waveguides.

FIG. 6, comprising Panels (a) through (d), depicts exemplary output spectra (PSD=Power Spectral Density). FIG. 6, Panels (a), (b), and (c) depict output spectrum of the suspended-Si waveguides with waveguide width of 4.3 μm, 4.0 μm, and 3.85 μm, respectively. The data is presented for 20 mW of average coupled-in power. The 6 μm mode profile of the waveguides is presented in the inset of Panel (a) with the SEM cross section of an example device shown as the inset of Panel (b). FIG. 6, Panel (d) depicts experimentally measured output spectra of the 4.2 μm wide device at different average, coupled-in powers.

DETAILED DESCRIPTION

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention provides novel waveguides and waveguide couplers for efficient in- and out-coupling of mid- and longwave-infrared light. The present invention further provides methods for transmitting an optical signal using the novel waveguides and waveguide coupler designs and orientations. In some embodiments, the waveguides and waveguide couplers of the present invention include one or more components that are suspended over a substrate by a bridging membrane. In some embodiments, the waveguides and waveguide couplers of the present invention include one or more components that are cantilevered from the edge of a substrate. In some embodiments, the waveguides and waveguide couplers of the present invention include one or more components that are suspended and/or cantilevered.

Figure 1A:
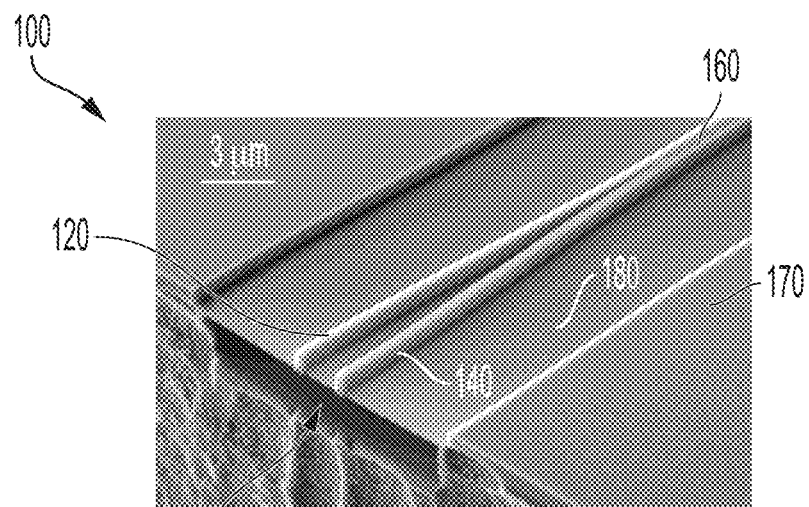
FIGS. 1A and 1B depict an interplanar coupler according to an embodiment of the invention.
Figure 1B:
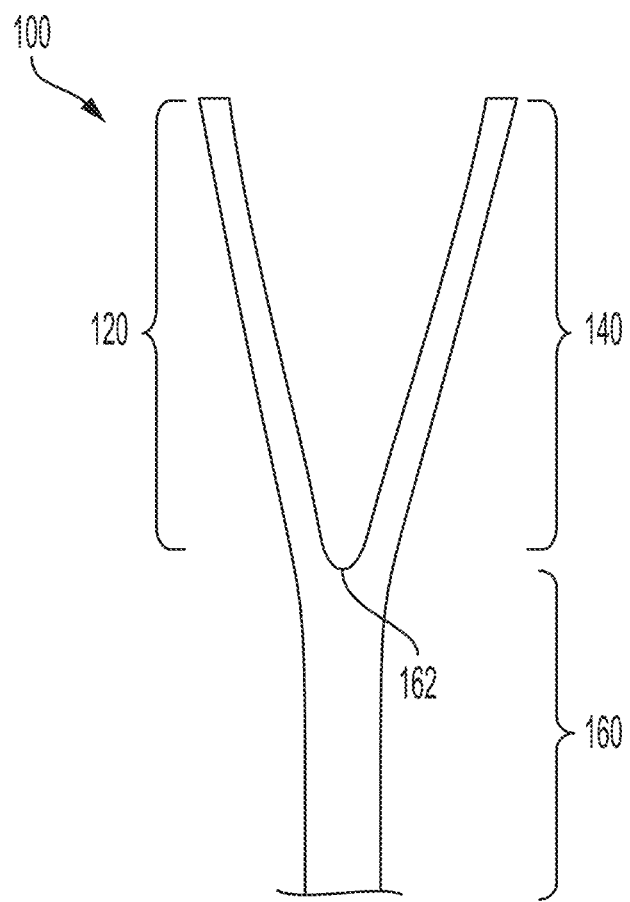
Figure 2:
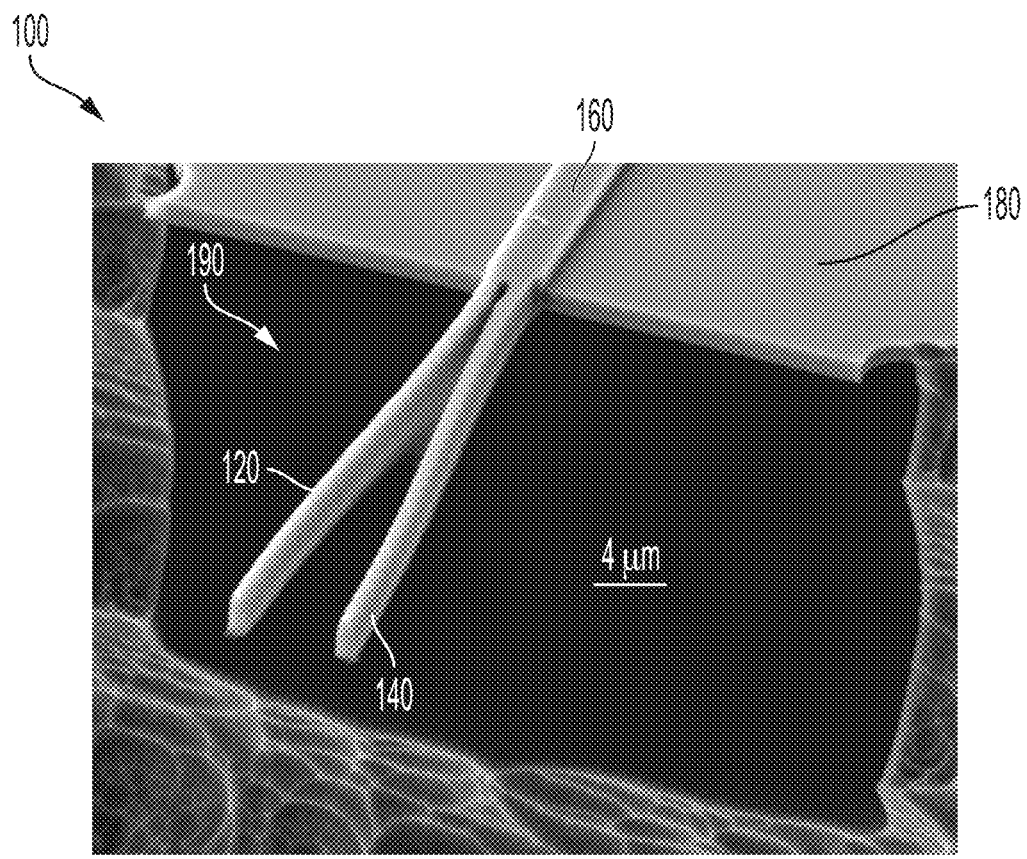
FIG. 2 depicts an interplanar coupler according to another embodiment of the invention.

Referring now to FIGS. 1A-2, embodiments of the present invention provide novel optical waveguide couplers suitable for use in photonic waveguides constructed on a substrate. Suspended optical waveguide coupler 100 of the present invention includes a first optical prong 120, a second optical prong 140, and an optical waveguide 160 with which first optical prong 120 and second optical prong 140 merge. One or more components of waveguide coupler 100 are positioned on a portion of a substrate 170 such as a bridging membrane 180. One or more components of waveguide coupler 100 may be suspended over one or more trenches 190 formed in substrate 170. For example, one or more components of waveguide coupler 100 may be suspended on bridging membrane 180 over one or more trenches 190. In some embodiments, one or more components of waveguide coupler 100 is cantilevered beyond an edge of bridging membrane 180, shown in FIG. 2. For the avoidance of doubt, although suspended waveguides are particularly advantageous, embodiments of the invention (with or without cantilevered portions) can be applied to non-suspended waveguides.

Optical Prongs

Referring now to FIGS. 1A-2, embodiments of waveguide coupler 100 include a first optical prong 120 and a second optical prong 140 having a curved planar profile. In some embodiments, each of first optical prong 120 and second optical prong 140 have, for example, a Bezier-type curvature, sinusoidal curvature, and the like, as understood in the art, extending from merge 162. In some embodiments, the curvature of first optical prong 120 is symmetric to the curvature of second optical prong 140. In some embodiments, each of first and second optical prong 120 and 140 are separated by an increasing center-to-center gap along their length from merge 162. The maximum center-to-center gap width or tip-to-tip width between the center of the tip of first optical prong 120 and the center of the tip of second optical prong 140, may be about 1.8 μm. The maximum tip-to-tip gap width may be about 1.5 μm to about 1.9 μm, about 1.0 μm to about 2.0 μm, about 0.5 μm to about 2.2 μm, and the like. In some embodiments, first optical prong 120 and second optical prong 140 span a distance where the planar width from an axially outer tip edge of the first optical prong 120 to an axially outer tip edge of the second optical prong 140 is greater than the planar width of optical waveguide 160.

In some embodiments, each of first optical prong 120 and second optical prong 140 extends a length from union 162. The length of each of first optical prong 120 and second optical prong 140 may be up to about 15 µm from union 162. The length of first and second optical prong 120 and 140 may be about 5 µm to about 15 µm, about 15 µm to about 20 µm, up to about 20 µm, or at least 20 µm.

Each of first optical prong 120 and second optical prong 140 may have a constant planar width. Each of first optical prong 120 and second optical prong 140 may have a symmetrically varying planar width. In some embodiments, the planar width of each of prongs 120 and 140 continuously tapers towards the tip of each prong. The planar width of each of prongs 120 and 140 may taper to a minimum planar width of about 175 nm. The planar width of first and second optical prong 120 and 140 may taper to a planar width of about 170 nm to about 180 nm, about 150 nm to about 200 nm, or about 100 nm to about 2500 nm. In some embodiments, first optical prong 120 and second optical prong 140 have an initial maximum planar width of about half the planar width of waveguide 160. Embodiments of first optical prong 120 and second optical prong 140 may have a thickness or vertical height of about 630 nm. First optical prong 120 and second optical prong 140 may have a thickness or vertical height of about 600 nm to about 700 nm, about 500 nm to about 800 nm, about 400 nm to about 1000 nm, and the like.

Each of first optical prong 120 and second optical prong 140 may be constructed of one of a variety of suitable materials as understood in the art, including but not limited to dielectrics such as silicon nitride, tantalum pentoxide, aluminum oxide, silicon oxynitride, lithium niobate, or aluminum nitride, semiconductors such as: group III-V compound semiconductors (gallium arsenide and ternary/quaternary compounds such as AlGaAs, InGaAs, InGaAsP), gallium nitride, gallium phosphide, and the like.

Embodiments of first optical prong 120 and second optical prong 140 may be positioned on one or more bridging membranes 180 over one or more trenches 190 in substrate 170, shown in FIG. 1A. Embodiments of first optical prong 120 and second optical prong 140 may be positioned such that at least a portion of first and second optical prong 120 and 140 extend at least partially beyond an edge of bridging membrane 180. First optical prong 120 and second optical prong 140 may be positioned such that each prong extends entirely beyond an edge of bridging membrane 180 as depicted in FIG. 2. First optical prong 120 and second optical prong 140 may be at least partially cantilevered beyond an edge of bridging membrane 180. First optical prong 120 and second optical prong 140 may be entirely cantilevered beyond an edge of bridging membrane 180. In some embodiments, first optical prong 120 and second optical prong 140 are at least partially cantilevered.

Embodiments of the floating waveguide couplers are particularly suitable for ultra-efficient narrow bandwidth couplers and broadband couplers.

Optical Waveguides

Referring now to FIGS. 1A-5, the suspended optical waveguide couplers include one or more optical waveguides 160 to which first optical prong 120 and second optical prong 140 merge. Embodiments of optical waveguide 160 may include a single, generally linear optically conductive material having a continuous planar width, shown in FIGS. 1A-3. The planar width of optical waveguide 160 may be about 3 µm. The planar width of optical waveguide may be about 3.0 µm to about 4.0 µm. The planar width of optical waveguide may be about 3.0 µm, about 3.0 µm to about 3.5 µm, about 3.5 µm to about 4.0 µm, about 4.0 µm to about 4.5 µm, or at least 4.5 µm. The planar width of optical waveguide may be about 3.1 µm, about 3.85 µm, about 4.0 µm, or about 4.2 µm. Optical waveguide 160 may taper to a planar width of about 300 nm to about 4500 nm. Embodiments of optical waveguide 100 may have a thickness or vertical height of about 630 nm, about 600 nm to about 700 nm, about 500 nm to about 800 nm, about 400 nm to about 1000 nm, and the like.

Figure 4:
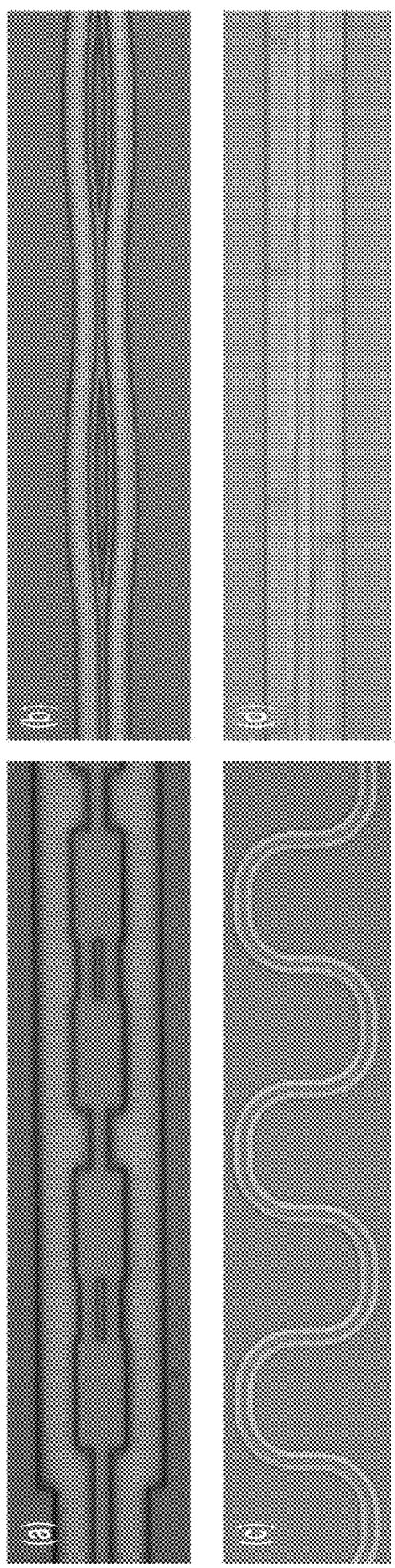
FIG. 4 depicts exemplary optical micrographs of exemplary test structures.

Embodiments of suspended waveguides 160 may include waveguides having nonlinear geometric configurations. For example and as shown in FIG. 4, embodiments of suspended waveguide 160 may include one or more suspended multimode interferometer (MMI) waveguides, Y-junction waveguides, 90° bend waveguides, and/or buried channel isolator (BCI) waveguides, respectively.

In certain embodiments, first optical prong 120, second optical prong 140, and optical waveguide 160 are each silicon waveguides. In some embodiments, the waveguide 160 is constructed from dielectric materials as understood in the art, for example, silicon nitride, silicon oxynitride, polymers, tantalum pentoxide, and the like. In some embodiments, the waveguides are constructed from semiconductor materials as understood in the art, for example crystalline silicon, amorphous silicon, and the like. In some embodiments, the waveguides are constructed from group III-V semiconductor compounds, for example gallium arsenide and ternary/quaternary compounds such as AlGaAs, InGaAs, InGaAsP, gallium arsenide, gallium nitride, gallium phosphide, aluminum gallium arsenide, and the like.

In certain embodiments, first optical prong 120, second optical prong 140, and optical waveguide 160 are formed by removing material from, for example, a silicon chip, silicon wafer, silicon-on-insulator wafer, or the like, as understood in the art. In some embodiments, material is moved by one or more techniques, including for example electron-beam lithography, dry etching or other appropriate techniques as understood in the art.

Substrate/Bridging Membrane

One or more components of suspended waveguide coupler 100 can be positioned on a silicon substrate 170. In some embodiments, substrate 170 includes, for example one or more of a silicon chip, a silicon wafer, a silicon membrane, a silicon-on-insulator platform, a silicon-on-sapphire platform, and the like, as understood in the art. One or more components of suspended waveguide coupler 100 may be coupled to substrate 170 and/or bridging membrane 180 by one or more standard techniques as understood in the art.

Referring now to FIGS. 1A-3, embodiments, of optical waveguide couplers 100 include bridging membrane 180 supporting one or more suspended waveguides 160 and waveguide couplers of the present invention. In some embodiments, bridging membrane 180 is constructed from the same material as any or all components of waveguide coupler 100. In some embodiments, bridging membrane 180 is constructed from different material than any or all components of waveguide coupler 100. In some embodiments, bridging membrane 180 is constructed from a slab of any one of a variety of materials, including but not limited to silicon, silicon nitride, silicon oxide, one or more dielectric materials such as silicon nitride, tantalum pentoxide, aluminum oxide, silicon oxynitride, lithium niobate, or aluminum nitride, one or more semiconductors such as: group III-V compound semiconductors (gallium arsenide and ternary/ quaternary compounds such as AlGaAs, InGaAs, InGaAsP), gallium nitride, gallium phosphide, and the like, as understood in the art. In some embodiments, bridging membrane 180 includes, for example, fusion-bonded membranes as understood in the art.

In some embodiments, bridging membrane has a thickness of about 70 nm. In some embodiments bridging membrane has a thickness of about 50 nm to about 100 nm. In some embodiments, bridging membrane has a thickness of about 10 nm to about 1000 nm. In some embodiments, bridging membrane is formed by removing material from, for example, a silicon chip, silicon wafer, silicon-on-insulator wafer, or the like, as understood in the art. In some embodiments, material is moved by one or more techniques, including for example electron-beam lithography, dry etching or other appropriate techniques as understood in the art.

Bridging membrane 180 can be positioned over one or more trenches 190 formed in substrate 180. Trench 190 may be parallel to and below a surface of the one or more waveguides 160. Trench 190 may be below one or more bridging membranes 170 coupled to optical waveguide 160 and suspending the optical waveguide over trench 190. Trench 190 may include a plurality of walls angled with respect to the optical waveguide, each of the walls providing a fluid-tight seal across the trench. In certain embodiments, the plurality walls form an angle with the optical waveguide greater than 0°, but less than 45°. The plurality of walls may be positioned at a 45° angle with respect to the optical waveguide. The plurality of walls may form an angle with the optical waveguide greater than 45°, but less than 90°. The plurality of walls may be positioned at a right (90°) angle with respect to the optical waveguide. In some embodiments, two adjacent walls of the plurality of walls define, in part, a microfluidic channel extending at an angle beyond trench 190. In some embodiments, the walls may have a thickness between 200 nm to 800 nm. In some embodiments, the walls underneath may consist of a different material from that of the optical waveguide. In some embodiments, the walls underneath may consist of the same material as the optical waveguide. For example, in some embodiments the walls consist of any one of a variety of materials, including but not limited to silicon, silicon nitride, silicon oxide, one or more dielectric materials such as silicon nitride, tantalum pentoxide, aluminum oxide, silicon oxynitride, lithium niobate, or aluminum nitride, one or more semiconductors such as: group III-V compound semiconductors (gallium arsenide and ternary/quaternary compounds such as AlGaAs, InGaAs, InGaAsP), gallium nitride, gallium phosphide, and the like, as understood in the art.

Embodiments of optical coupler 100, as described herein, are embedded in a cladding material. In some embodiments, the cladding material includes material of lower refractive index than the waveguide structure, for example silicon dioxide.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Mid-Infrared Integrated Photonic Elements and Efficient Couplers on Fusion-Bonded, Suspended Silicon Membranes The mid-infrared spectrum of light offers an opportunity for the analysis of complex liquid and gas mixtures for environmental, industrial and military applications. Integrated photonic technology developed for this spectral region allows widespread and reliable networks of sensors that can perform these functions. Silicon photonics is a promising material platform, given its low cost, mature processing and wideband transparency. Several variations on the platform have been explored to avoid the intrinsic material losses of the buried oxide layer found in the conventional silicon-on-insulator (SOI) platform. Fusion-bonded silicon membranes offer the best compatibility with conventional photonic design via their fabrication method, which involves transferring a thin layer of crystalline silicon onto a silicon wafer pre-patterned with trenches. Afterward, waveguides and devices are patterned over the trenches to form highly stable, air-clad suspended structures. Since the membrane is free of perforations (which are typically required for membranes release via undercut etching), it retains structural integrity over a broader range of designs. In this work, the design and experimental realization of several key building blocks for advanced integrated photonic systems on this platform are disclosed. The fabrication flow, then the measurement setup, and finally the results obtained from this run are described herein. Fabrication began by fusion-bonding a 76 mm-diameter SOI wafer to a bulk silicon wafer pre-patterned with trenches on the surface. The backside silicon and buried oxide layers were removed from the SOI wafer, resulting in a 700 nm-thick crystalline silicon membrane. Structures were patterned onto 6×10 mm dies via electron-beam lithography and dry etching (etch depth of 630 nm). Finally, the dies were released from the handle substrate via deep reactive ion etching. This allows for the fabrication of edge couplers with smooth facets and precise alignment to the end of the die. Each chip was measured by coupling free-space light at 3.06 μm generated by difference-frequency generation with a mode-locked laser. Objective lenses with NA=0.56 were used at the input and output. An average input power of ~1 mW was used to avoid the onset of nonlinearities during propagation through the waveguides.

TABLE 1

Passive device measurements

| Device Type | Number of devices for cutback | Normalized transmissions (dB) | Loss per device (dB) |
| --- | --- | --- | --- |
| MMI 1 × 2 | 0, 22 | 0, −8.9 | 0.4 |
| Y-junction 1 × 2 | 0, 12, 22 | 0, −8.3, −14.2 | 0.65 |
| 90° bend | 0, 80 | 0, −3.1 | 0.04 |
| Buried channel isolator | 0, 10, 20 | 0, −4.9, −7.0 | 0.35 |

Figure 3:
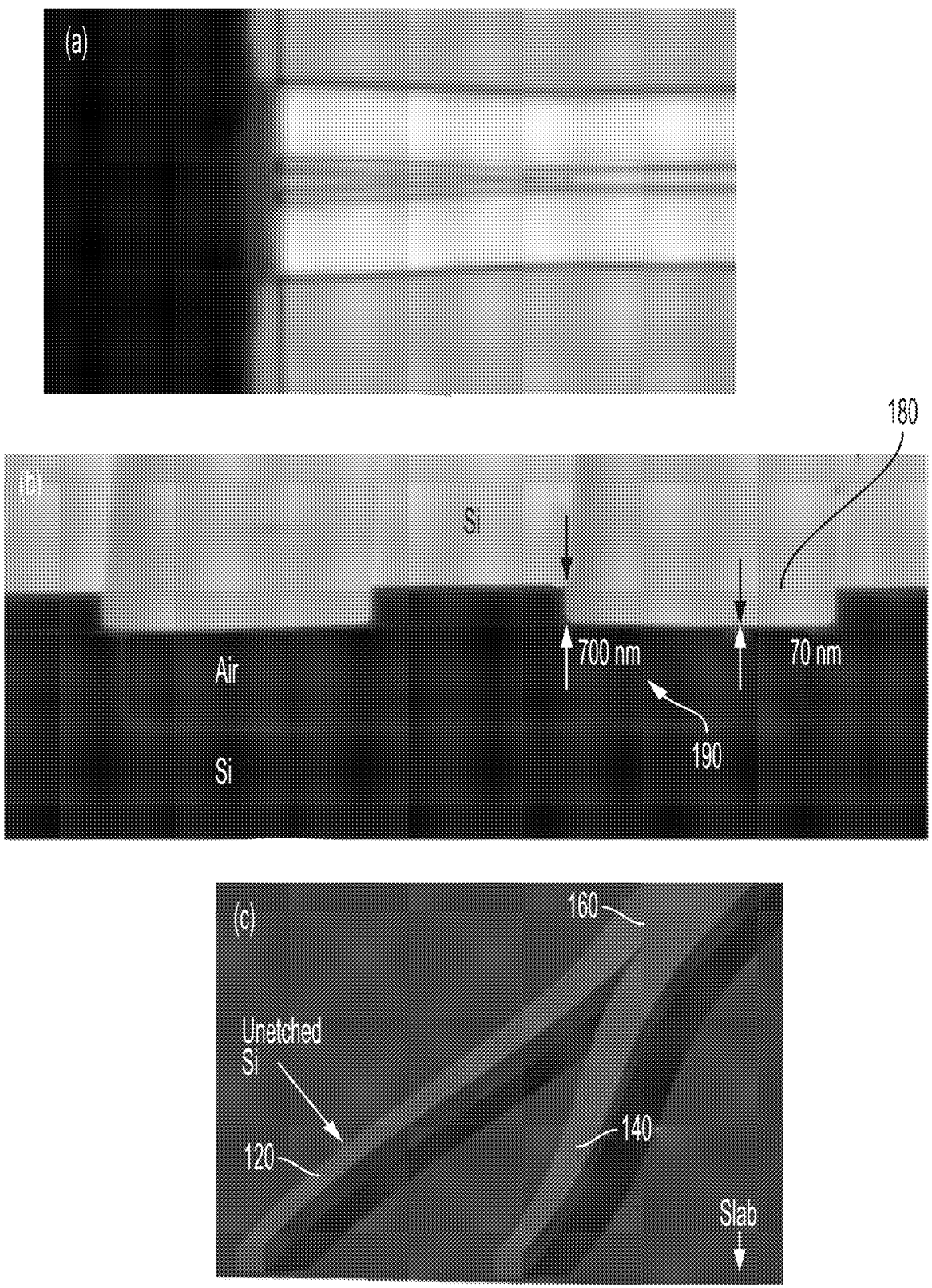
FIG. 3 depicts exemplary forked couplers of the present invention.

For mid-infrared integrated photonics to be a successful effort, it is critical to realize efficient coupling of light on- and off-chip. To this end, forked couplers compatible with suspended membranes were designed that can operate with low coupling losses over a wide bandwidth (FIG. 3, Panels a and c). An array of such couplers with variations on their design parameters was tested to determine the best performance. The optimal device had a minimum tip width of ~175 nm, a tip-to-tip gap of 1.8 µm, and a length of 15 µm to the point where the tips merge. Following this portion of the coupler, the waveguide was tapered up to 3.1 µm width for the remainder of the chip, then was outcoupled through an identical coupler on the opposite side. A maximum normalized transmission of −6.2 dB was measured through the chip. Propagation losses were estimated via paperclip-folded cutback structures to be 4.7 dB/cm. Correcting for the accumulated 2.6 dB of propagation loss, the loss per facet is ~1.8 dB. The actual loss of each coupler is likely somewhat lower, since each facet includes a "buried channel isolator" component (described in the next paragraph) with a small but finite loss associated with it.

Next, the performance of several types of passive devices fabricated in the same run was investigated. These included Y-type 1×2 power splitters, multimode interferometer (MMI) 1×2 power splitters, and 90° bends with 25 µm radius. Additionally, a novel integrated photonic structure for suspended membrane structures was demonstrate, the "buried channel isolator" (BCI). It consists of an angled, submicron silicon wall contacting the waveguide bottom surface (FIG. 4, Panel d). For future microfluidic applications leveraging the subsurface channels naturally available on this platform, it is necessary to direct fluid flow in certain paths throughout the chip without it leaking out through the input/output optical paths. The BCI allows a low-optical-loss transition to a hermetically sealed channel. This structure and the others mentioned earlier were tested by the cutback method using varying numbers of the devices. The results are reported in Table 1. Low losses were achieved in all listed devices: 0.4 dB/MMI, 0.65 dB/Y-splitter, 0.35 dB/BCI, and 0.04 dB/bend.

In summary, the successful design, fabrication, and characterization of several key integrated components for mid-infrared photonics, using fusion-bonded, suspended silicon membranes has been shown herein. First, input/output couplers showing 1.8 dB/coupler at λ=3.06 µm was achieved. Next, the "buried channel isolator" (BCI) which allows the seamless, low-loss routing of light between hermetically sealed channels on a chip was introduced. A loss of 0.35 dB/BCI was observed. Finally, Y-type and MMI-type 1×2 power splitters showing 0.65 dB and 0.4 dB per splitter, respectively, and 90° bends of 25 µm radius with 0.04 dB loss per 90° bend were measured. These results show promise for advanced integrated photonic systems operating in the mid-infrared.

Example 2: Suspended-Si Waveguides for Spectral Engineering of Mid-IR Frequency Combs Silicon (Si) waveguides are an excellent platform for mid-IR (3-6 µm) nonlinear optics due to their high nonlinear index $n_2$ (~6×10−5 $cm^2/GW$ at 3 µm) and low multiphoton absorption. This has opened up opportunities to use group velocity dispersion (GVD) engineered devices in conjunction with high-power, ultrafast mid-IR lasers to generate on-chip supercontinuum spectra suitable for myriad applications. Here, GVD-engineered suspended-Si waveguides are presented, fabricated in a 700-nm-thick Si layer. The suspended photonic platform not only removes the extra cladding absorption at wavelengths larger than 3.2 µm, it also benefits from the full core-cladding index contrast for dispersion engineering of the waveguides, in contrast to the historically utilized platforms such as Si-on-Insulator, or Si-on-Sapphire. Fusion-bonded membranes enhance the stability and provide greater flexibility in the geometry of the suspended structures.

Waveguide Design, Fabrication and Testing

Suspended-Si waveguide devices 6 mm in length with efficient forked-shaped couplers were patterned with an electron beam writer and etched with $SF_6/C_4F_8$. A schematic diagram of the fabricated waveguide cross sections is shown in FIG. 5, Panel (a). Paperclip waveguides with different lengths are also fabricated to measure propagation and coupling losses of 4.7 dB/cm and 5 dB/facet, respectively. The loss numbers are measured at the pump wavelength of 3.06 µm for a waveguide width, wgW, of 3.1 µm. FIG. 5, Panel (b) shows a focus-stacked image of a fabricated waveguide chip with microscope images of forked-couplers and paperclip devices shown in FIG. 5, Panels (c) and (d), respectively.

In the fabricated waveguides, the Si layer is etched by 630 nm, leaving a slab thickness of 70 nm to support the suspended structures. We have fabricated devices of various wgW for nonlinear applications, with three widths of 3.85 µm, 4.0 µm, and 4.2 µm having the desired dispersion profile for broadband mid-infrared (mid-IR) light generation as shown in FIG. 5, Panel (e). A difference-frequency-generated (DFG) frequency comb centered at 3.06 µm, with 80 mW average power, and 100 fs pulse length is used to pump the Si waveguides.

For optical measurements, the 3.06 µm pump is coupled to $TE_0$ mode of the waveguides using a chalcogenide aspheric lens. The output spectra of the waveguides are measured using three different spectrometers due to their broad bandwidth. For near-IR measurement up to 2.4 µm, a multimode $InF_3$ fiber with the core diameter of 100 µm is end-coupled to the waveguides and the output of the fiber is monitored with an optical-spectrum-analyzer (Yokogawa AQ6375B). For the spectrum around the 3 µm, the $InF_3$ fiber output is coupled to a THORLABS® OSA205C Fourier transform infrared spectrometer (FTIR). To capture the long wavelength side of the spectrum, the output of the waveguide is collected with an identical chalcogenide lens and sent to a free space FTIR.

FIG. 6, Panels (a), (b), and (c) show the output spectra of the devices with wgW of 4.2 µm, 4.0 µm, and 3.85 µm, respectively. The output spectrum of the 4.2 µm width waveguide extends from 1.74 µm to 6 µm in the mid-infrared with simultaneous optical bandwidth of 126 THz. Moreover, the output of this waveguide has a 3 dB spectral flatness from 3.5 µm to 5.5 µm, making such a mid-IR light suitable for broadband spectroscopy applications covering the atmospheric window of 3 µm to 5 µm. The transmission of all devices drops at 6 µm due to the mode leakage to the Si substrate. The simulated λ=6 µm mode of the waveguides (inset of FIG. 6, Panel (a)) exhibits 40 dB/cm of substrate-leakage loss. The trench depth can be readily increased in future experiments specifically tailored toward long-wavelength broadening. The output optical powers of the waveguides have been measured to be 1 mW to 1.5 mW depending on the device. The optical spectrum of the 4.2 µm wide waveguide is also measured for different coupled-in average powers and is shown in FIG. 6, Panel (d). Only 15 mW of average power is needed in the waveguide to generate the broadest spectra with 127 THz bandwidth.

Spectral broadening of the mid-IR frequency combs across 126 THz bandwidth using suspended-Si waveguides has been presented. The output spectrum of the waveguides is measured at different coupled powers and it is shown that only 15 mW of coupled average power is required to realize the broadening with full spectral bandwidth. Such low pump power requirements can enable the integration of these devices with other nonlinear optical platforms to realize chip-based coherent infrared light sources with applications in a range of laboratory spectroscopies, lab-on-a-chip diagnostics, and scanning probe microscopies.

INCORPORATION BY REFERENCE

The disclosures of each and every patent, patent application, and publication cited herein are hereby incorporated herein by reference in their entirety.

EQUIVALENTS

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

In particular, those of skill in the art will recognize that although exemplary dimensions are provided herein, particular dimensions can be selected to best match wavelengths and other parameters of interest.

The invention claimed is:

1. A system comprising:
an on- and off-chip optical coupler comprising:
   a first optical prong wherein the first optical prong is airclad;
   a second optical prong wherein the second optical prong is airclad, the second optical prong being symmetrical to the first optical prong;
   a suspended optical waveguide with which the first optical prong and the second optical prong merge, and a bottom surface of the suspended optical waveguide disposed above a trench at least along a width of the suspended optical waveguide;
wherein:
   a distance from an axially outer tip edge of the first optical prong to an axially outer tip edge of the second optical prong is greater than a planar width of the optical waveguide;
   the first optical prong and the second optical prong are each tapered from the optical waveguide; and
   the first optical prong and the second optical prong together provide on- and off-chip coupling through the optical waveguide.

2. The optical coupler of claim 1, wherein the first optical prong and the second optical prong are continuously tapered.

3. The optical coupler of claim 1, wherein the first optical prong and the second optical prong have a planar profile selected from the group consisting of: sinusoidal and Bezier-type.

4. The optical coupler of claim 1, wherein the first optical prong and the second optical prong are suspended optical waveguides.

5. The optical coupler of claim 1, wherein the first optical prong and the second optical prong each have an axial length from tip to merger of about 20 μm or less.

6. The optical coupler of claim 1, wherein the first optical prong and the second optical prong each have an axial length from tip to merger of about 15 μm.

7. The optical coupler of claim 1, wherein the first optical prong and the second optical prong each have a planar width greater than 100 nm but less than about 2500 nm.

8. The optical coupler of claim 1, wherein the first optical prong and the second optical prong each have a tip-to-tip gap of between 300 nm to 2000 nm.

9. The optical coupler of claim 1, wherein the suspended optical waveguide tapers to a planar width of about 300 nm to 4500 nm.

10. The optical coupler of claim 1, wherein the suspended optical waveguide tapers to a planar width selected from the group consisting of: about 3.1 μm, about 3.85 μm, about 4.0 μm, and about 4.2 μm.

11. The optical coupler of claim 1, wherein the first optical prong, the second optical prong, and the suspended optical waveguide are each silicon waveguides.

12. The optical coupler of claim 1, wherein the first optical prong, the second optical prong, and the suspended optical waveguide form a complete device consisting of materials selected from the group consisting of: dielectrics, silicon nitride, tantalum pentoxide, aluminum oxide, silicon oxynitride, lithium niobate, aluminum nitride, semiconductors, group III-V compound semiconductors, gallium arsenide, ternary/quaternary compounds, AlGaAs, InGaAs, InGaAsP, gallium nitride, and gallium phosphide.

13. The optical coupler of claim 1, wherein the entire structure is embedded in a cladding material of lower refractive index than the optical waveguide.

* * * * *